(12) United States Patent
Sato et al.

(10) Patent No.: US 6,643,039 B1
(45) Date of Patent: *Nov. 4, 2003

(54) HOLOGRAPHIC REFLECTOR AND REFLECTIVER LIQUID CRYSTAL DISPLAY USING IT

(75) Inventors: Atsushi Sato, Tokyo (JP); Luis Manuel Murillo-Mora, Funabashi (JP)

(73) Assignee: Toppan Printing, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/868,896

(22) Filed: Jun. 4, 1997

(30) Foreign Application Priority Data

| Jun. 5, 1996 | (JP) | 8-142895 |
|---|---|---|
| Jul. 15, 1996 | (JP) | 8-184446 |
| Nov. 15, 1996 | (JP) | 8-304626 |

(51) Int. Cl.$^7$ .................. G02B 5/32; G02F 1/1335
(52) U.S. Cl. .................. 359/15; 359/19; 349/5; 349/113
(58) Field of Search .................. 359/10, 11, 13, 359/15, 24, 31, 19; 349/5, 106, 112

(56) References Cited

U.S. PATENT DOCUMENTS

| 5,491,569 A | * | 2/1996 | Riccobono et al. ........... 359/3 |
| 5,602,657 A | * | 2/1997 | Dickinson et al. ........... 359/15 |
| 5,621,547 A | * | 4/1997 | Loiseaux et al. ........... 359/15 |
| 5,659,408 A | * | 8/1997 | Wenyon ........... 359/15 |
| 5,734,457 A | * | 3/1998 | Mitsui et al. ........... 359/15 |
| 5,745,203 A | * | 4/1998 | Valliath et al. ........... 359/15 |
| 5,760,850 A | * | 6/1998 | Nakanishi et al. ........... 349/5 |

FOREIGN PATENT DOCUMENTS

| EP | 0 675 343 A2 | 10/1995 |
| JP | 8-505716 | 6/1996 |
| WO | 95/12826 | 5/1995 |
| WO | 96/37805 | 11/1996 |

OTHER PUBLICATIONS

Patent Abstracts of Japan, No. 08095019, Apr. 12, 1996.

A.G. Chen, et al., "Holographic Reflective Liquid–Crystal Display", *Journal of the SID*, 1995, pp. 159–163.

P.J. Ralli, et al., "Holographic Diffusers for Reflective LCDs", *SID 96 Applications Digest*, pp. 3–6.

Herwig Kogelnik, "Coupled Wave Theory for Thick Hologram Gratings," *The Bell System Technical Journal*, vol. 48, No. 1969, pp. 2909–2947.

\* cited by examiner

*Primary Examiner*—Audrey Chang
(74) *Attorney, Agent, or Firm*—Staas & Halsey LLP

(57) ABSTRACT

When illumination light is externally incident on a liquid crystal display, of the incident light, light of a polarized component in one direction passes through a polarizing film to reach a liquid crystal panel. After the light reaching the liquid crystal panel is optically rotated in accordance with the display pattern displayed on the liquid crystal panel, it reaches a polarizing film. The light passing through the polarizing film enters a holographic reflector. The incident light passes through a hologram without being diffracted due to the angle selectivity of the hologram. Light passing through the hologram is regularly reflected by a metal reflective layer arranged on the back surface of the hologram to be incident on the hologram again. Incident light (reflected light) is incident on the hologram at an incident angle having a plus or a minus sign reverse to the previous incident light. The incident light matches the angle selectivity of the hologram, and is transmitted and diffracted at a specific angle to become diffracted light. The diffracted light passes through the polarizing film, the liquid crystal panel, and the polarizing film again to reach observer's eyes as pattern display light.

18 Claims, 8 Drawing Sheets

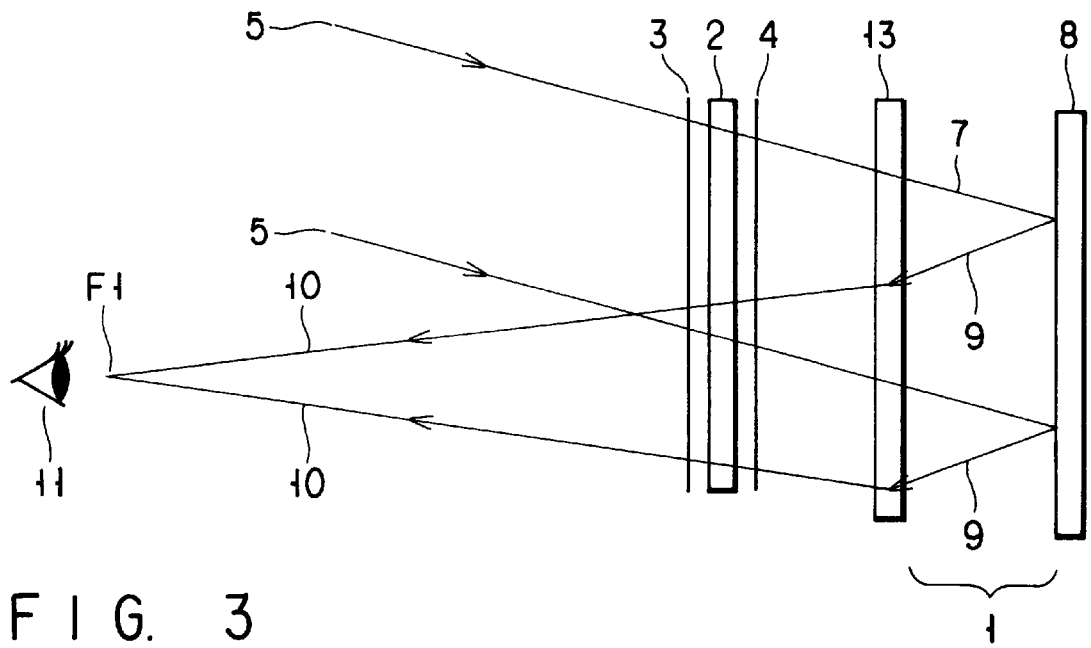
F I G. 3
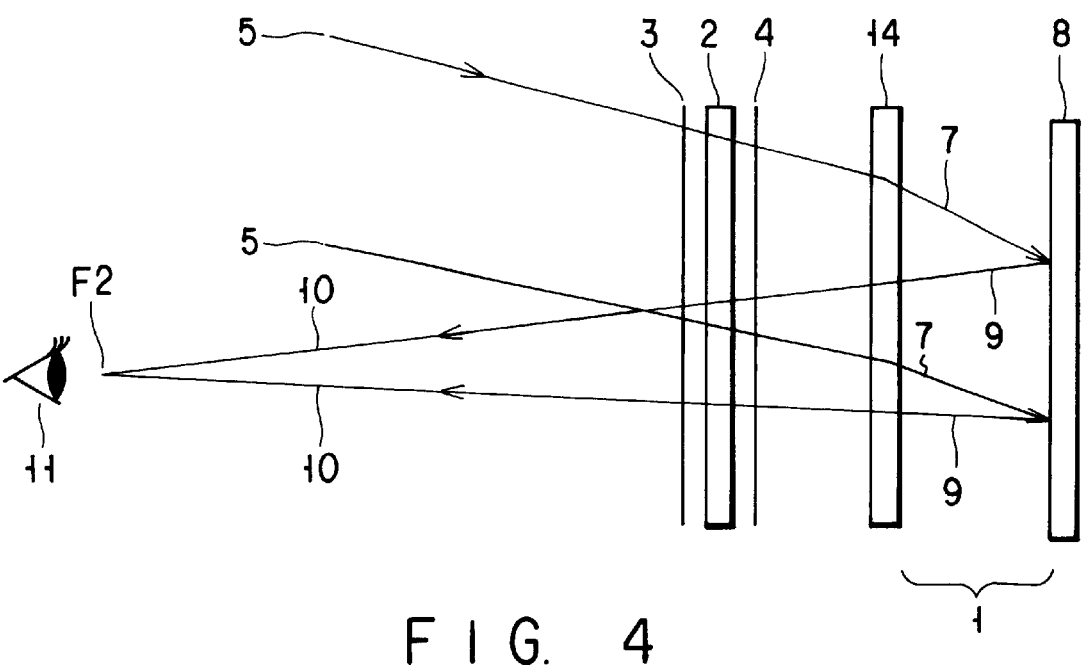
F I G. 4

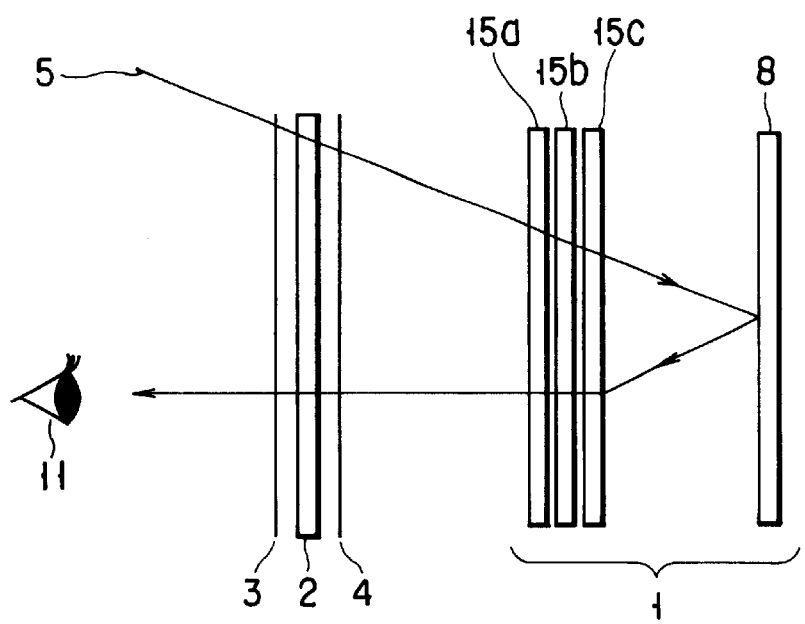
F I G. 5
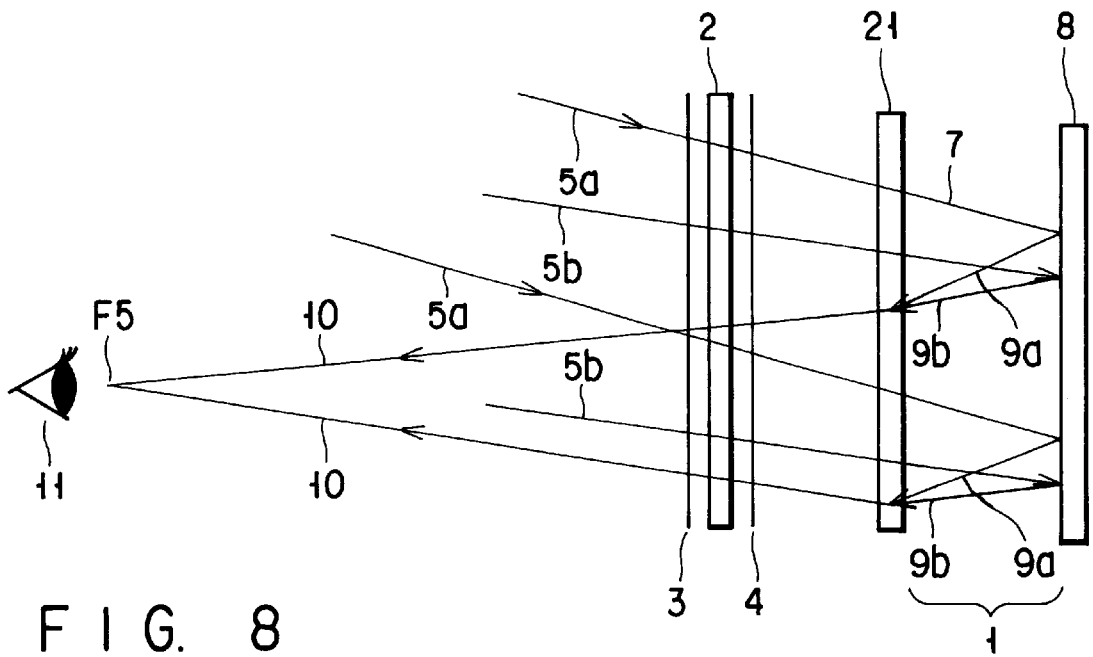
F I G. 8

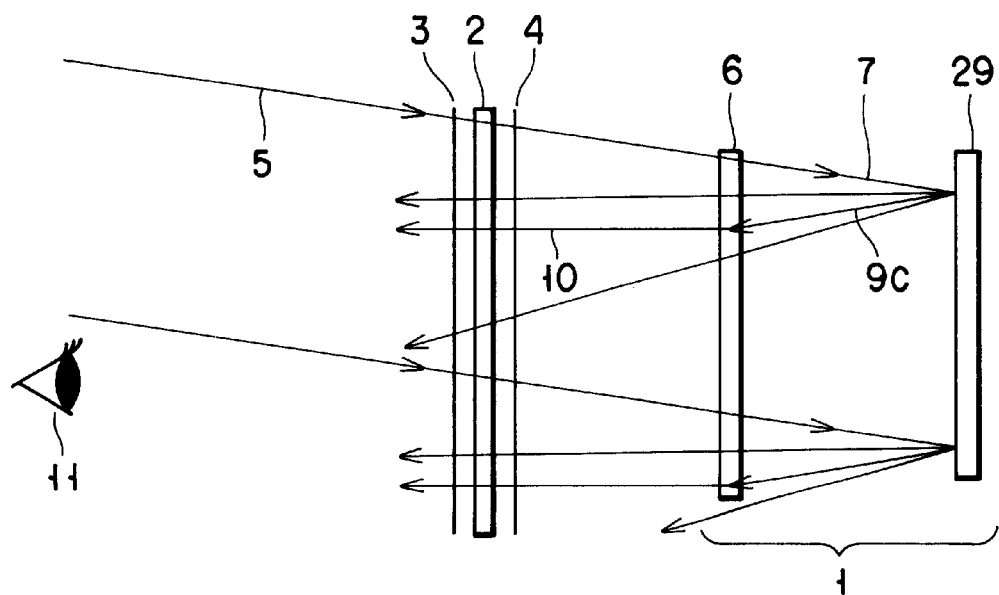
F I G. 11
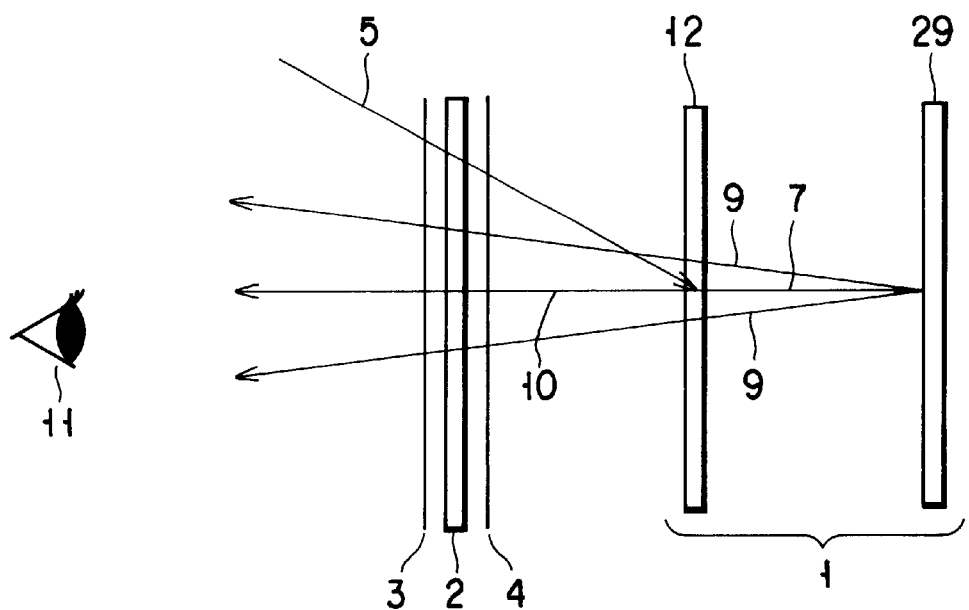
F I G. 12

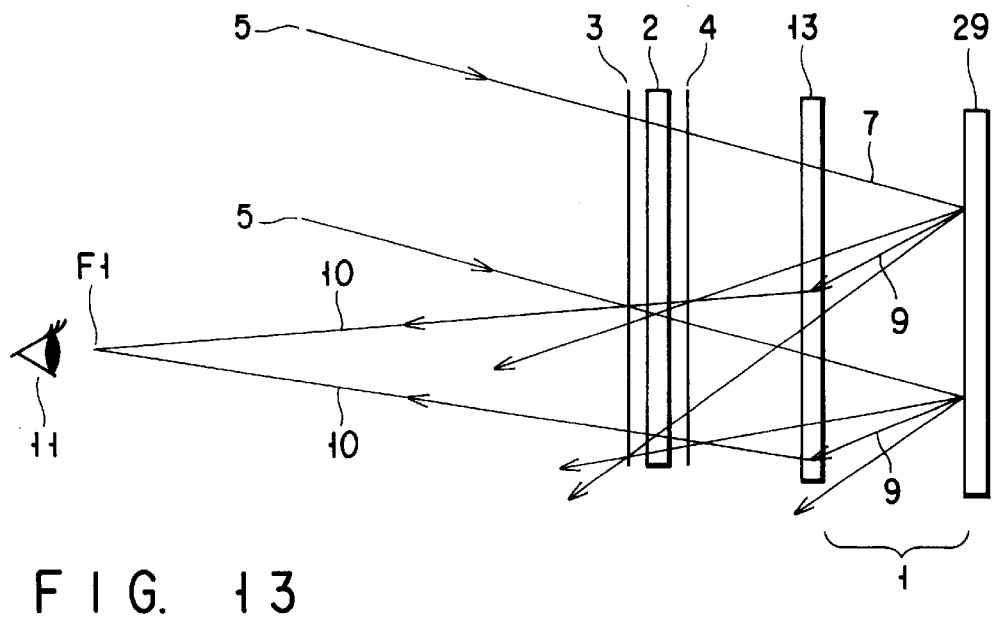
F I G. 13
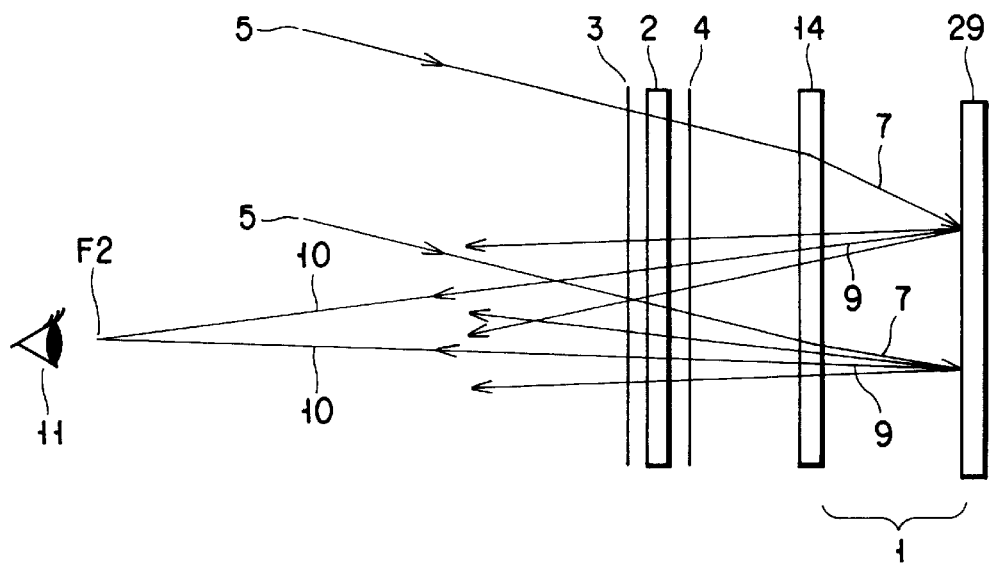
F I G. 14

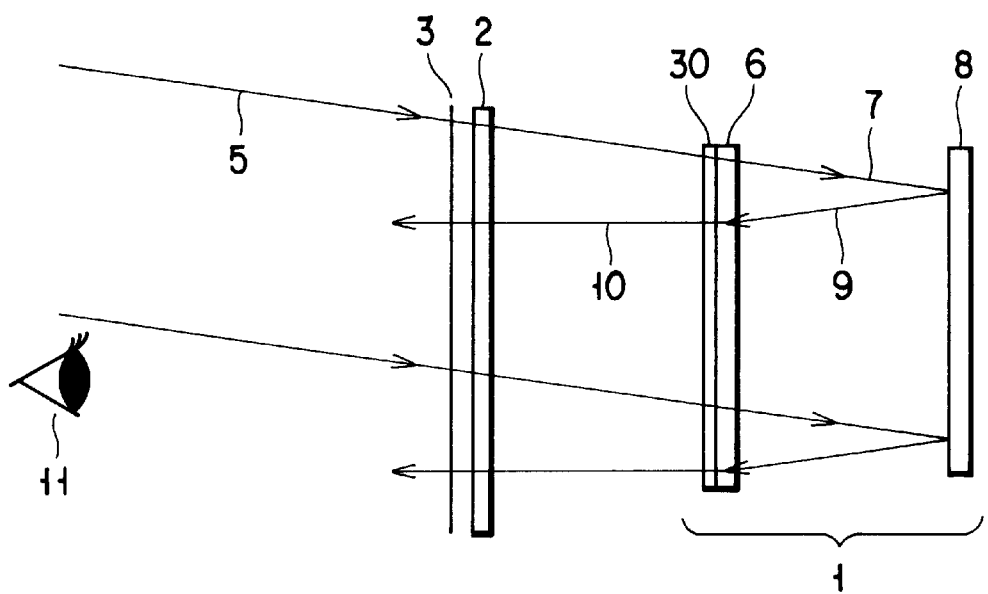
F I G. 15

HOLOGRAPHIC REFLECTOR AND REFLECTIVER LIQUID CRYSTAL DISPLAY USING IT

BACKGROUND OF THE INVENTION

The present invention relates to a reflective liquid crystal display and, more particularly, to a reflective liquid crystal display capable of providing a bright display, and a holographic reflector used in this apparatus.

The entire contents of Japanese Patent Applications No. 8-142895 filed on Jun. 5, 1996, No. 8-184446 filed on Jul. 15, 1996, and No. 8-304626 filed on Nov. 15, 1996 are incorporated herein by reference.

Liquid crystal displays include a reflective liquid crystal display in which a reflective layer is arranged on the back surface of a liquid crystal panel to avoid the use of any backlight. In this reflective liquid crystal display, light (external light such as indoor illumination or sunlight) from the observer side is reflected by the reflective layer through the liquid crystal panel, and reflected light corresponding to a pattern displayed on the liquid crystal panel travels toward the observer.

Recently, in the reflective liquid crystal display, the use of a reflection hologram as the reflective layer in place of the existing metal reflective layer has been examined. In the reflective liquid crystal display using such a reflection hologram, the viewing range and the reflection direction of reflected light can be specified, and a brighter display in a specific direction can be realized compared to the display apparatus using the metal reflective layer.

When, however, the reflection hologram in use is a surface relief type hologram, the diffraction efficiency is difficult to increase. Moreover, the color sensed by the observer changes in accordance with the observation direction due to color dispersion of the applied hologram.

When the reflection hologram in use is a volume type reflection hologram, the width of the wavelength to be reflected and diffracted due to wavelength selectivity is small. For this reason, reflected light colored (in a specific color except for white and silver) is undesirably sensed. A bright display throughout all the visible wavelength region is difficult to realize.

To attain a color display in the liquid crystal display, a well-known color filter of, e.g., pigment dispersion type is employed together with the liquid crystal panel. In the reflective liquid crystal display, however, the display brightness decreases due to absorption of light by the color filter, and the cost increases.

BRIEF SUMMARY OF THE INVENTION

It is the first object of the present invention to provide a holographic reflector capable of realizing a bright display in a reflective liquid crystal display using a hologram as a reflective layer, and the reflective liquid crystal display using it.

It is the second object of the present invention to provide a holographic reflector capable of controlling light having a large reflection/diffraction wavelength band width and a high diffraction efficiency to attain a bright display in a predetermined direction in a reflective liquid crystal display using a hologram as a reflective layer, and the reflective liquid crystal display using it.

According to an aspect of the present invention, there is provided a holographic reflector comprising: a volume type transmission hologram having angle selectivity; and a reflective layer arranged on one surface of said volume type transmission hologram.

In this manner, since the reflective layer is arranged on the back surface of the volume type transmission hologram, the holographic reflector can have a high diffraction efficiency (reflectance of external light) and a large diffraction wavelength band width. In addition, a bright display can be attained within a predetermined range corresponding to the focusing function of a hologram lens.

Since the hologram is a volume type transmission hologram having angle selectivity, incident light (or light reflected by the reflective layer) is diffracted by the hologram to emerge as reflected light in a direction different from the regular reflection direction of the incident light. The observer does not sense an image of the light source for the incident light formed upon reflection on the hologram surface, and the viewing range and the reflection direction can be specified.

The angle selectivity is an optical property of the hologram in which only light incident at a specific angle (direction) leaves at a specific angle (direction) as diffracted light. The specific angle (direction) is determined in accordance with the conditions in recording the hologram.

A plurality of different types of hologram lenses can be (1) multiple-recorded on a single holographic material, (2) integrated by stacking, or (3) recorded in areas divided into patterns on a single holographic material.

With this arrangement, the direction of the incident light (external light) which contributes to reflection is hardly limited. Even if the observer moves his/her viewpoint, he/she can satisfactorily sense the reflected light. In this manner, the range of observation conditions which allow the observer to sense bright reflected light can be widened.

In this case, "a plurality of different types of hologram lenses" transmit (1) a single reconstruction illumination beam to emit a plurality of types of diffracted beams with different focal point positions, or (2) different reconstruction illumination beams to send diffracted beams to the same focal point position.

As described above, a holographic reflector capable of realizing a bright display in a reflective liquid crystal display using not a metal reflective layer but a hologram as a reflective layer, and the reflective liquid crystal display using the reflector can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view showing the schematic arrangement of a reflective liquid crystal display using a holographic reflector with a focusing function according to the third embodiment of the present invention;

FIG. 4 is a view showing the schematic arrangement of a reflective liquid crystal display using a holographic reflector with a focusing function according to the fourth embodiment of the present invention;

FIG. 5 is a view showing the schematic arrangement of a reflective liquid crystal display using a holographic reflector according to the fifth embodiment of the present invention;

FIG. 8 is a view showing the schematic arrangement of a reflective liquid crystal display using a holographic reflector according to the seventh embodiment of the present invention;

FIG. 11 is a view showing an example of the schematic arrangement of a reflective liquid crystal display using a holographic reflector according to the ninth embodiment of the present invention;

FIG. 12 is a view showing another example of the schematic arrangement of the reflective liquid crystal display using the holographic reflector according to the ninth embodiment of the present invention;

FIG. 13 is a view showing still another example of the schematic arrangement of the reflective liquid crystal display using the holographic reflector according to the ninth embodiment of the present invention;

FIG. 14 is a view showing still another example of the schematic arrangement of the reflective liquid crystal display using the holographic reflector according to the ninth embodiment of the present invention; and FIG. 15 is a view showing the schematic arrangement of a reflective liquid crystal display using a holographic reflector according to the 10th embodiment of the present invention.

DETAILED DESCRIPTION OF THE INVENTION

Figure 1:
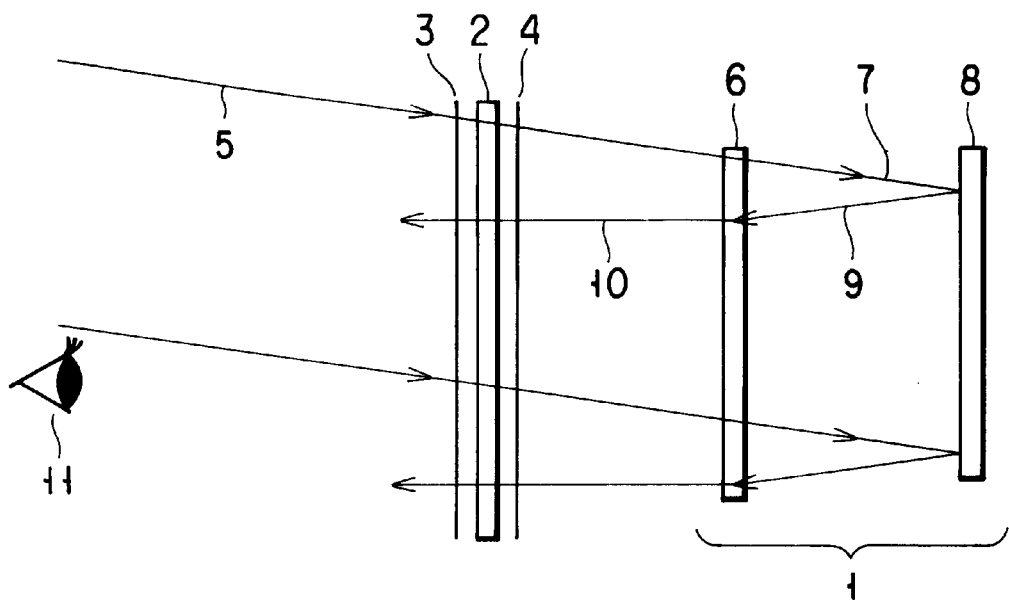
FIG. 1 is a view showing the schematic arrangement of a reflective liquid crystal display using a holographic reflector with angle selectivity according to the first embodiment of the present invention.

Several embodiments of the present invention will be described below with reference to several views of the drawing.

FIG. 1 shows the schematic arrangement of a reflective liquid crystal display using a holographic reflector according to the present invention. A holographic reflector 1 is arranged behind a liquid crystal panel 2, and constituted by a volume type transmission hologram 6 having angle selectivity and a metal reflective layer 8, as shown in FIG. 1.

The angle selectivity means an optical property of the hologram in which only light incident at a specific angle (direction) leaves at a specific angle (direction) as diffracted light. More specifically, when two beams are incident on the hologram 6 at two incident angles having reverse, plus and minus signs, one incident beam is transmitted through the hologram 6 without being diffracted, while the other is diffracted in a predetermined direction (angle). The angle selectivity changes in accordance with various conditions in recording a hologram to be applied. The hologram to be applied can be formed to have desired unique angle selectivity.

In FIG. 1, the hologram 6 and the reflective layer 8 are spaced apart from each other to better show the optical properties (optical paths of incident and reflected beams). In fact, they may be integrated by stacking or deposition. This relationship between the hologram and the reflective layer similarly holds in the following description in this specification.

Polarizing films 3 and 4 for transmitting only a polarized light component in one direction are arranged before and after the liquid crystal panel 2.

The operation when illumination light 5 is incident on the reflective liquid crystal display shown in FIG. 1 will be explained below.

When the illumination light 5 is externally incident on the liquid crystal display, of the incident light, only light of a polarized component in one direction is transmitted through the polarizing film 3 to reach the liquid crystal panel 2. After the light reaching the liquid crystal panel 2 is optically rotated in accordance with a pattern displayed on the liquid crystal panel 2, it reaches the polarizing film 4.

The light transmitted through the polarizing film 4 enters the holographic reflector 1. Since the volume type transmission hologram 6 having angle selectivity is arranged on the liquid crystal panel 2 side of the holographic reflector 1, the incident light is transmitted through the hologram 6 without being diffracted due to the angle selectivity of the hologram 6. Transmitted light 7 passing through the hologram 6 is regularly reflected by the metal reflective layer 8 arranged on the back surface of the hologram 6 to be incident on the hologram 6 again. Light (reflected light) 9 is incident on the hologram 6 at an incident angle having a plus or a minus sign reverse to that of the previous incident light 7. The incident light 9 matches with the angle selectivity of the hologram 6, and is diffracted at a specific angle by the hologram 6 to become diffracted light 10.

The diffracted light 10 is transmitted through the polarizing film 4, the liquid crystal panel 2, and the polarizing film 3 again to reach observer's eyes 11 as pattern display light.

Note that the specific angle (transmission direction upon diffraction) is set such that the diffracted light is incident on the surface of the liquid crystal panel 2 at right angles, as shown in FIG. 1.

Next, the second embodiment of the present invention will be described with reference to FIG. 2.

Figure 2:
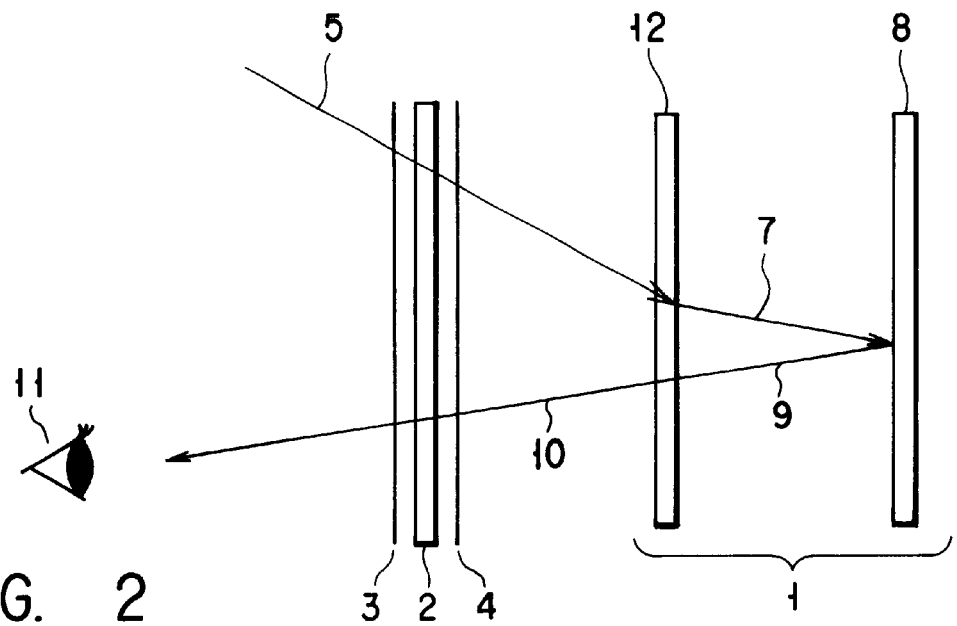
FIG. 2 is a view showing the schematic arrangement of a reflective liquid crystal display using a holographic reflector with angle selectivity according to the second embodiment of the present invention.

In FIG. 2, the angle selectivity of a volume type transmission hologram 12 is set to be different from that of the hologram 6 in the first embodiment, and the remaining arrangement is the same as that shown in FIG. 1.

As described above, desired angle selectivity can be imparted to a hologram to be used in accordance with the recording conditions for the hologram.

In the first embodiment, the angle selectivity is set to transmit the incident light 5 coming from the observer side through the hologram 6 without diffraction, and diffract the light 9 reflected by the reflective layer 8. In the second embodiment, the hologram 12 is formed by recording interference fringes so as to diffract incident light 5 and transmit reflected light 9 without diffraction.

Since the remaining constituent elements except for the volume type transmission hologram 12 are identical to those in the first embodiment, the same reference numerals denote the same parts, and a detailed description thereof will be omitted.

The operation when the illumination light 5 is incident on the reflective liquid crystal display shown in FIG. 2 will be explained below.

When the illumination light 5 is externally incident on the liquid crystal display, of the incident light, only light of a polarized component in one direction is transmitted through a polarizing film 3 to reach a liquid crystal panel 2. After the light reaching the liquid crystal panel 2 is optically rotated in accordance with a pattern displayed on the liquid crystal panel 2, it reaches a polarizing film 4.

The light transmitted through the polarizing film 4 enters a holographic reflector 1. Since the volume type transmission hologram 12 having the above-mentioned angle selectivity is arranged on the liquid crystal panel 2 side of the holographic reflector 1, the incident light which matches with the angle selectivity of the hologram 12 is diffracted by the hologram 12 in a specific direction, and transmitted therethrough. Light 7 passing through the hologram 12 is regularly reflected by a metal reflective layer 8 arranged on the back surface of the hologram 12 to be incident on the hologram 12 again. Since incident light (reflected light) 9 has an incident angle with a plus or a minus sign reverse to that of the previous incident light 7 and different from that of the incident light 5, it is transmitted through the hologram 12 without being diffracted. Transmitted light 10 passes through the polarizing film 4, the liquid crystal panel 2, and the polarizing film 3 again to reach observer's eyes 11 as pattern display light.

In the holographic reflector and the reflective liquid crystal display using it according to the first and second embodiments, a large diffraction wavelength band width can be attained on condition of a high diffraction efficiency.

Since the hologram is a volume type transmission hologram having angle selectivity, incident light (or light reflected by the reflective layer) is diffracted by the hologram to emerge as reflected light in a direction different from the regular reflection direction of the incident light. Therefore, the observer does not sense an image of the light source for incident light formed upon reflection on the hologram surface. The viewing range and reflection direction of the display apparatus can be specified.

The third embodiment of the present invention will be described with reference to FIG. 3.

FIG. 3 shows the schematic arrangement of a reflective liquid crystal display using a holographic reflector according to the present invention. Since the remaining constituent elements except for a volume type transmission hologram (holographic lens) 13 are identical to those in the first and second embodiments, the same reference numerals denote the same parts, and a detailed description thereof will be omitted. The angle selectivity of the volume type transmission holographic lens 13 used in the third embodiment is set to be different from those of the holograms 6 and 12 of the above-mentioned first and second embodiments.

In the third embodiment, the holographic lens 13 is formed by recording interference fringes so as to have angle selectivity of transmitting incident light 5 coming from the observer side without diffraction, and diffracting reflected light 9 coming from the reflective layer 8 side. Further, the holographic lens 13 is formed to bring the diffracted, transmitted light in to a focus at focal point position F1.

The operation when the illumination light 5 is incident on the reflective liquid crystal display shown in FIG. 3 will be explained below.

When the illumination light 5 is externally incident on the liquid crystal display, of the incident light, only light of a polarized component in one direction passes through a polarizing film 3 to reach a liquid crystal panel 2. After the light reaching the liquid crystal panel 2 is optically rotated in accordance with a pattern displayed on the liquid crystal panel 2, it reaches a polarizing film 4.

The light transmitted through the polarizing film 4 enters a holographic reflector 1. Since the volume type transmission holographic lens 13 having the above-mentioned angle selectivity is arranged on the liquid crystal panel 2 side of the holographic reflector 1, the incident light is transmitted through the holographic lens 13 without being diffracted due to the angle selectivity of the holographic lens 13. Light 7 transmitted through the holographic lens 13 is regularly reflected by the metal reflective layer 8 arranged on the back surface of the holographic lens 13 to be incident the holographic lens 13 again. Incident light (reflected light) 9 is incident on the holographic lens 13 at an incident angle having a plus or a minus sign reverse to that of the previous incident light 7. The light 9 matches with the angle selectivity of the holographic lens 13, and is diffracted by the holographic lens 13 at a specific angle to become diffracted light 10.

The transmitted, diffracted light propagates through the polarizing film 4, the liquid crystal panel 2, and the polarizing film 3 again to be brought into a focus at the focal point position F1 of the holographic lens 13 and reach observer's eyes 11 as the pattern display light 10.

The fourth embodiment of the present invention will be described with reference to FIG. 4.

FIG. 4 shows the schematic arrangement of a reflective liquid crystal display using a holographic reflector according to the present invention. Since the remaining constituent elements except for a volume type transmission hologram (holographic lens) 14 are identical to those in the third embodiment, the same reference numerals denote the same parts, and a detailed description thereof will be omitted. The angle selectivity of the volume type transmission holographic lens 14 used in the fourth embodiment is set to be different from those of the holograms 6, 12, and 13 described above.

In the fourth embodiment, the holographic lens 14 is formed by recording interference fringes so as to have angle selectivity of diffracting incident light 5 coming from the observer side, and transmitting reflected light 9 coming from the reflective layer 8 side without diffraction. Further, the holographic lens 14 is formed to bring the diffracted, transmitted light into a focus at a position (specular virtual image) F2 symmetrical to an original focal point position F (not shown) of the holographic lens 14.

The operation when the illumination light 5 is incident on the reflective liquid crystal display shown in FIG. 4 will be explained below.

When the illumination light 5 is externally incident on the liquid crystal display, of the incident light, only light of a polarized component in one direction is transmitted through a polarizing film 3 to reach a liquid crystal panel 2. After the light reaching the liquid crystal panel 2 is optically rotated in accordance with a pattern displayed on the liquid crystal panel 2, it reaches a polarizing film 4.

The light transmitted through the polarizing film 4 enters a holographic reflector 1. Since the volume type transmission holographic lens 14 having the above-mentioned angle selectivity is arranged on the liquid crystal panel 2 side of the holographic reflector 1, the incident light which matches with the angle selectivity of the holographic lens 14 is diffracted by the holographic lens 14 in a specific direction and transmitted therethrough. Light 7 transmitted through the holographic lens 14 is regularly reflected by the metal reflective layer 8 arranged on the back surface of the holographic lens 14 to be incident on the holographic lens 14 again. Since incident light (reflected light) 9 has an incident angle with a plus or a minus sign reverse to that of the previous incident light 7 and different from that of the incident light 5, it is transmitted through the holographic lens 14 without being diffracted.

The transmitted, diffracted light travels through the polarizing film 4, the liquid crystal panel 2, and the polarizing film 3 again to be brought into a focus at the position F2 symmetrical to the focal point position F of the hologram lens 14 and reach observer's eyes 11 as the pattern display light 10.

As described above, in the holographic reflector and the reflective liquid crystal display using it according to the third and fourth embodiments, a high diffraction efficiency (reflectance of external light) and a large diffraction wavelength band width can be attained. If the hologram to be applied has a focusing function, a bright display can be realized within a predetermined range.

Since the hologram is a volume type transmission hologram having angle selectivity, incident light (or light reflected by the reflective layer) is diffracted by the hologram to emerge as reflected light in a direction different from the regular reflection direction of the incident light. Therefore, the observer does not sense an image of the light source for incident light formed upon reflection on the hologram surface. The viewing range and reflection direction of the display apparatus can be specified.

The fifth embodiment of the present invention will be described with reference to FIG. 5.

FIG. 5 shows the schematic arrangement of a reflective liquid crystal display using a hologram constituted by stacking volume type transmission holograms 15a, 15b, and 15c consisting of three types of interference fringes with different spatial frequencies. Since the remaining constituent elements except for the volume type transmission holograms 15a, 15b, and 15c are identical to those in the first embodiment, the same reference numerals denote the same parts, and a detailed description of the arrangement and operation will be omitted.

The volume type transmission holograms 15a, 15b, and 15c are formed to diffract red, green, and blue components, respectively and to transmit the components in an observer's direction. Their angle selectivities are set such that the holograms transmit and diffract an incident beam from the reflective layer side, similar to the above-described first embodiment.

In the holographic reflector and the reflective liquid crystal display using it according to the fifth embodiment, the diffraction angles of three color components are is equalized by combining the three types of holograms so as to prevent a change in diffraction angle in accordance with the color due to the color dispersion characteristic of the hologram. Therefore, the observer can observe the display apparatus, while preventing a change in color in accordance with the observation angle.

The fifth embodiment is not limited to the above arrangement. The same function and advantage can be obtained by applying a hologram formed by multiple-recording a plurality of types of interference fringes on one holographic material. In this case, the schematic arrangement except for the hologram itself is the same as that in FIG. 1.

The angle selectivities of the volume type transmission holograms 15a, 15b, and 15c may be set to transmit and diffract incident light from the observer side, and to transmit incident light from the reflective layer 8 side, similar to the second embodiment.

In the holographic reflector and the reflective liquid crystal display using it according to the fifth embodiment, the influence of color dispersion of the hologram is reduced by integrally stacking holographic materials on which a plurality of types of interference fringes with different spatial frequencies are recorded. Even if the observer observes the display apparatus from many different directions, the color reconstructed from the hologram upon diffraction hardly changes.

The sixth embodiment according to the present invention will be described with reference to FIGS. 6 and 7.

Figure 6:
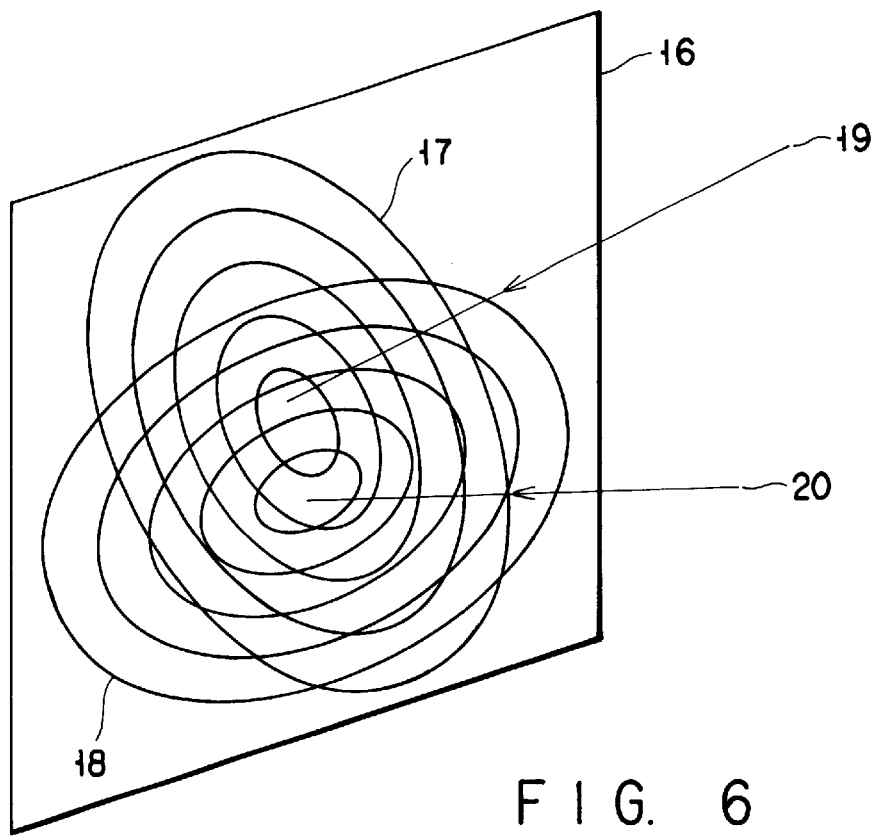
FIG. 6 is a view for explaining interference fringes recorded on the hologram of a holographic reflector according to the sixth embodiment of the present invention.

FIG. 6 schematically shows an example of a hologram 16 (hologram lens) applied in the sixth embodiment. In this embodiment, two different types of hologram lenses are multiple-recorded on one holographic material as volume type transmission holograms consisting of two different types of interference fringes 17 and 18.

The respective hologram lenses 17 and 18 are recorded when object beams 19 and 20 (object beams such as a beam originating from a point source, that diverge and irradiate the holographic material) in recording interfere with identical reference beams (not shown) on the holographic material.

Figure 7:
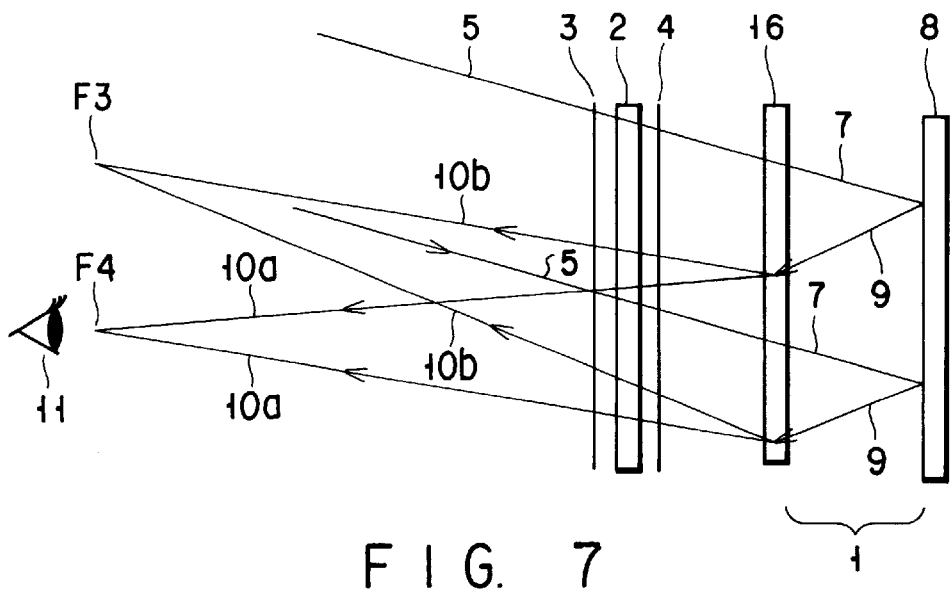
FIG. 7 is a view showing the schematic arrangement of a reflective liquid crystal display using the holographic reflector shown in FIG. 6.

FIG. 7 shows the schematic arrangement of a reflective liquid crystal display using a holographic reflector 1 applied with the volume type transmission hologram 16. Since the remaining constituent elements except for the volume type transmission hologram 16 are identical to those in the third embodiment, the same reference numerals denote the same parts, and a detailed description thereof will be omitted.

With the use of the above-described hologram 16, when the image of the hologram 16 is reconstructed, an incident beam conjugate to a reference beam in recording is transmitted and diffracted to become two converging diffracted beams having different focal point positions (the position of the point source in recording) equivalent to the optical paths of the object beams in recording.

For this reason, the following operation is performed, unlike the operation in the third embodiment when the illumination light 5 is irradiated. After an illumination beam 5 passes through the hologram 16 without being diffracted, it is reflected by a reflective layer 8 to be incident on the hologram 16 again. When this incident beam is conjugate to the reference beam in recording, two converging diffracted beams 10a and 10b are transmitted and diffracted to emerge toward different focal point positions F3 and F4.

Note that the hologram 16 can be formed to transmit and diffract the illumination beam 5 coming from the observer side and transmit an incident beam 9 coming from the reflective layer 8 side without diffraction, similar to the fourth embodiment shown in FIG. 4. In this case, the beam emerging from the liquid crystal display is brought into a focus at the position of a specular virtual surface with respect to the focal point position (the position of the point source in recording) equivalent to the optical path of the object beam in recording the hologram 16.

The number of hologram lenses recorded on the holographic material can be changed to a desired number.

In FIG. 7, the focal point positions F3 and F4 are set to be shifted only in the vertical direction of the liquid crystal display for the sake of illustrative convenience. Therefore, the focal point positions F3 and F4 can be set free in three dimensions. In practice, the focal point positions F3 and F4 can be set to shifted in the horizontal direction, or in the slanting direction.

The method of fabricating a plurality of different types of hologram lenses is not limited to multiple recording. The same effect can be obtained by stacking of hologram lenses or recording in areas divided into patterns.

According to the above-described sixth embodiment, the direction of incident light (external light) which contributes to reflection is hardly limited. Even if the observer moves his/her viewpoint, he/she can satisfactorily sense reflected light. In this manner, the range of observation conditions which allow the observer to sense bright reflected light can be broadened.

The seventh embodiment according to the present invention will be described with reference to FIG. 8 below.

FIG. 8 shows the schematic arrangement of a reflective liquid crystal display using a holographic reflector according to the present invention. Since the remaining constituent elements except for a volume type transmission hologram 21 are identical to those in the sixth embodiment, the same reference numerals denote the same parts, and a detailed description thereof will be omitted.

The volume type transmission hologram 21 is another example of multiple recording of the hologram 16 in the sixth embodiment. The hologram 21 is obtained by bringing a single object beam to interference with reference beams from a plurality of directions on a holographic material, thereby recording two different types of hologram lenses as a volume type transmission hologram consisting of two different types of interference fringes. When the image of the hologram 21 is reconstructed, incident beams (external beams) from a plurality of directions which are conjugate to the reference beam in recording are transmitted and diffracted to become one converging diffracted beam.

For this reason, the following operation is performed, unlike the operation in the third embodiment when the illumination light 5 is irradiated. After different illumination beams 5a and 5b pass through the hologram 21 without being diffracted, they are reflected by a reflective layer 8 to be incident on the hologram 21 again. When incident beams 9a and 9b are conjugate to the reference beam in recording, they are transmitted and diffracted to emerge as one converging diffracted beam 10 that converges to an identical focal point position F5.

The hologram 21 can be formed to transmit and diffract the illumination beam 5 coming from the observer side, and transmit the incident beam 9 coming from the reflective layer 8 side without diffraction, similar to the fourth embodiment shown in FIG. 4. In this case, the beam emerging from the liquid crystal display is brought into a focus at the position of a specular virtual image with respect to the focal point position (the position of the point source in recording) equivalent to the optical path of the object beam in recording the hologram 21.

The number of hologram lenses recorded on the holographic material can be changed to a desired number.

The method of fabricating a plurality of different types of hologram lenses is not limited to multiple recording. The same effect can be obtained by stacking of hologram lenses or recording in areas divided into patterns.

According to the seventh embodiment of the present invention, sufficiently bright reflected light can be supplied to the viewpoint of the observer.

In a combination of the sixth and seventh embodiments, sufficiently bright reflected light can be supplied to the viewpoint of the observer, and at the same time, sufficiently bright reflected light can be supplied even if the observer moves his/her viewpoint.

The eighth embodiment of the present invention will be described with reference to FIGS. 9 and 10 below.

Figure 9:
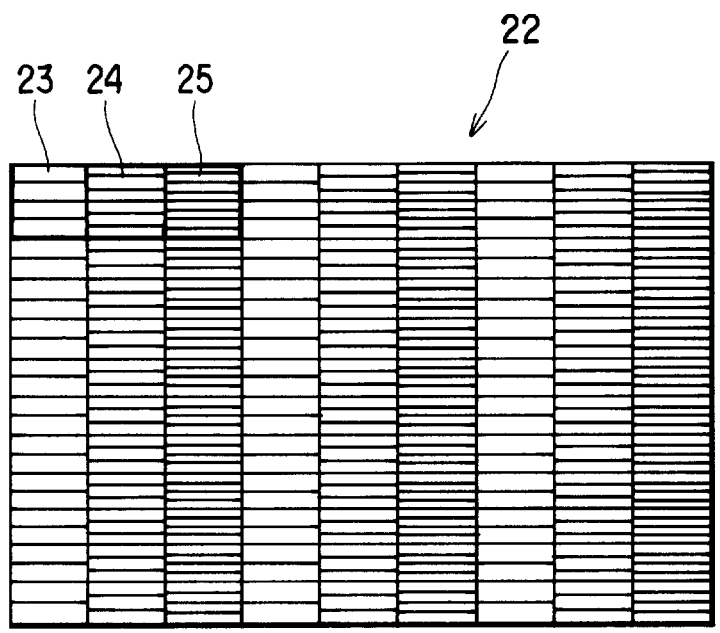
FIG. 9 is a view showing an example of a specific pattern set on the hologram of a holographic reflector according to the eighth embodiment of the present invention.

FIG. 9 is a schematic view of a hologram 22 (constituted by arranging, in a specific pattern, holograms consisting of a plurality of types of interference fringes with different spatial frequencies) of a holographic reflector according to the eighth embodiment when viewed from the front. As shown in FIG. 9, volume type transmission holograms 23, 24, and 25 having different spatial frequencies are arranged in a specific pattern (stripe pattern in FIG. 9), and three adjacent hologram cells 23, 24, and 25 transmit and diffract red, green, and blue components, respectively. That is, the hologram cells 23, 24, and 25 correspond to one pixel of a liquid crystal panel in use.

The pattern shown in FIG. 9 is an example of the specific pattern. The holographic reflector of the present invention is not limited to the pattern shown in FIG. 9. A stripe array, a delta array, and other patterns can be used as far as the pattern agrees with the pixel array of the liquid crystal panel in use.

Figure 10:
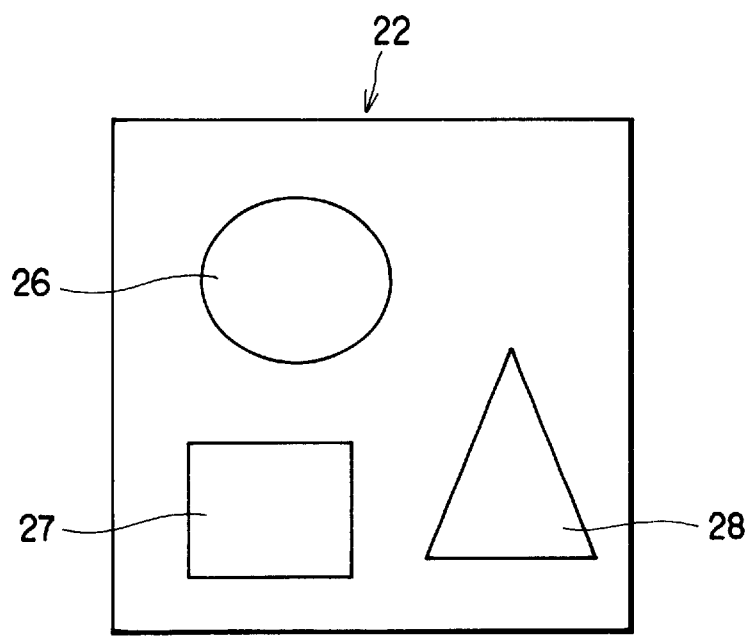
FIG. 10 is a view showing another example of the specific pattern set on the hologram of the holographic reflector according to the eighth embodiment of the present invention.

Alternatively, as shown in FIG. 10, three types of holograms 26, 27, and 28 may be arranged in correspondence with a circle, a rectangle, and a triangle as specific patterns, and the respective figures may be observed in different colors. In this manner, specific characters or figures can be displayed in specific colors.

The schematic arrangements of the holographic reflector having the hologram 22 and the reflective liquid crystal display using the holographic reflector are the same as those in the above-mentioned first and second embodiments, and a description of the arrangement and operation will be omitted.

In the holographic reflector and the reflective liquid crystal display using it according to the eighth embodiment, a full-color displaying can be accomplished in a specified direction by integrating the holograms consisting of a plurality of types of interference fringes with different spatial frequencies by multiple recording or stacking.

The ninth embodiment of the present invention will be described with reference to FIGS. 11 to 14 below.

FIGS. 11 to 14 show the schematic arrangements of holographic reflectors and reflective liquid crystal displays using them according to the ninth embodiment.

The respective reflective liquid crystal displays in FIGS. 11 to 14 correspond to those of the above-described first to fourth embodiments. Therefore, the same reference numerals denote the same parts, and a detailed description thereof will be omitted.

The reflective layer 8 has a mirror surface in the first to fourth embodiments, whereas a scattering reflective surface is used for a reflective layer 29 in the ninth embodiment shown in FIGS. 11 to 14. Therefore, the ninth embodiment is different from the first to fourth embodiments in the following operation.

Light diffracted by a hologram 6, 12, 13, or 14 of a holographic reflector 1 or transmitted therethrough without being diffracted is reflected and scattered by the reflective layer 29. In the display apparatus corresponding to the first or third embodiment, of the reflected, scattered light, only light which matches the angle selectivity of the hologram 6 or 13 is transmitted and diffracted (see FIGS. 11 and 13). In the display apparatus corresponding to the second or third embodiment, all the reflected, scattered light passes through the hologram 12 or 14 (see FIGS. 12 and 14).

In the holographic reflector and the reflective liquid crystal display using it according to the ninth embodiment, since the reflective layer has a scattering reflective surface, the range where reflected light is focused can be widened. Therefore, a bright display can be realized within a predetermined wide range without limiting the viewing range (reflection direction) to a narrow range. This technique of the ninth embodiment can be applied to not only the first to fourth embodiments but also to the fifth to eighth embodiments.

Finally, the 10th embodiment of the present invention will be described with reference to FIG. 15.

FIG. 15 shows the schematic arrangements of a holographic reflector and a reflective liquid crystal display using it according to the 10th embodiment.

The angle selectivity of a hologram 6 applied in this reflective liquid crystal display is the same as that in the above-described first embodiment. This reflective liquid crystal display is different from the apparatus of the first embodiment in that no polarizing film 4 is arranged on the holographic reflector 1 side of a liquid crystal panel 2, and a polarizing layer 30 is formed on the liquid crystal panel 2 side of the hologram 6. Since the remaining constituent elements are identical, the same reference numerals in the 10th embodiment denote the same parts as in the above embodiments, and a detailed description thereof will be omitted.

The polarizing layer 30 is formed to function as a protective layer for the hologram 6, and to serve as a polarizing layer necessary for the liquid crystal panel 2 when the hologram 6 is incorporated in the liquid crystal display.

In the holographic reflector 1 of the 10th embodiment, interference fringes photographed and recorded on the hologram 6 are protected. When the hologram 6 is incorporated in the liquid crystal display, or the liquid crystal display is carried, the hologram 6 can be prevented from being damaged. Further, since no polarizing film need be formed on the reflective layer 8 side of the display panel 2, the arrangement of the liquid crystal display except for the holographic reflector 1 can be simplified.

Although FIG. 15 shows the embodiment based on the first embodiment, the holographic reflector having the polarizing layer 30 can also be applied to the remaining embodiments described above.

The above-mentioned holographic reflector in the first to tenth embodiments may be entirely formed like a film. With this shape, the holographic reflector can be easily incorporated in the liquid crystal display.

The reflector layer coupled with the holograms of the first to tenth embodiments could have the property of being a partially transmitted layer providing this feature the possibility to use also a backlight for the illumination of the liquid crystal display whenever necessary.

In general, to obtain a large diffraction wavelength band width in a volume type reflection hologram, similar to the volume type transmission hologram, the modulation degree of the refractive index must be several times higher than that required in a transmission hologram, and the holographic material is required to have higher performance. It is widely recognized in this technical field that the diffraction wavelength band width of a volume type transmission hologram is larger than that of a volume type reflection hologram, a detailed description of which will be omitted in this specification. This is explained in, e.g., "Coupled wave theory" printed in the paper of THE BELL SYSTEM TECHNICAL JOURNAL, November 1969, Volume 48, Number 9.

The volume type transmission hologram in the first to 10th embodiments can be recorded by a normal double-beam photographing optical system using a phase type volume hologram holographic material. As the holographic material, dichromated gelatin, a silver halide holographic material, a photopolymer, and the like can be used. For example, a film of a hologram silver halide holographic material 8E56 available from AGFA company can be used.

The hologram in the first, second and fifth embodiments is photographed and recorded in two known photographing steps. A laser as a light source can be an argon laser (wavelength: 514.5 nm). In the first step, a Fresnel hologram is photographed using a diffusion plate (frosted glass) as an object. In the second step, the real image of the diffusion plate reconstructed from the Fresnel hologram is photographed again as an image type hologram. After the hologram is photographed in the second step, it is developed with a developing solution CWC2, bleached with a bleaching solution PBQ2, washed with water, and dried, thereby obtaining a volume type transmission hologram. Aluminum is deposited (or an aluminum foil having a scattering reflective surface is laminated) on the base side, i.e., the back surface of this hologram, thereby obtaining a holographic reflector.

The hologram in the third, fourth, sixth and seventh embodiments is produced by using a double-beam. In the double-beam, a diverging beam from a point light source is used as the object light and a parallel beam is used as the reference light. The hologram is photographed and recorded by shifting incident angles of the both beams by a desired degree, thereby obtaining the volume type transmission hologram.

In the above description, if a desired mask pattern is arranged near a portion before the holographic material in the second photographing step, and photographing is repeatedly performed after moving the mask pattern step by step each time the photographing wavelength is changed, a holographic reflector used in the eighth embodiment can be formed.

Even if the angle of the reference light is changed instead of the wavelength, the same effect can be obtained.

As has been described above, according to the first to 10th embodiments of the present invention, a holographic reflector capable of realizing a bright display in a reflective liquid crystal display using not a metal reflective layer but a hologram as a reflective layer can be provided.

In the reflective liquid crystal display using the metal reflective layer, the background of a liquid crystal display pattern is grayish. However, in the reflective liquid crystal display using the holographic reflector of the present invention, a white or full-color background can be realized.

In the conventional display apparatus using the holographic reflector in place of the metal reflective layer, its luminance is undesirably low though a white or full-color background can be realized. According to the present invention, a bright color display can also be realized throughout the visible wavelength region.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a liquid crystal display panel having front and rear sides;
   a volume type transmission hologram having front and rear sides, with the front side arranged to face the rear side of the liquid crystal display panel; and
   a reflector arranged at the rear side of the volume type transmission hologram, wherein the volume type transmission hologram transmits light received from the liquid crystal display panel without diffraction and diffracts and focuses light received from the reflector in order to direct the diffracted and focused light to a predetermined direction.

2. The liquid crystal display device according to claim 1, wherein the transmission hologram directs and focuses the diffracted light to a predetermined oblique direction other than a direction orthogonal to the liquid crystal display device.

3. The liquid crystal display device according to claim 2, wherein said transmission hologram comprises a plurality of holographic elements on which interference fringes with different spatial frequencies are recorded.

4. The liquid crystal display device according to claim 2, wherein interference fringes with different spatial frequencies are recorded on said transmission hologram.

5. The liquid crystal display device according to claim 2, wherein interference fringes with different spatial frequencies and different focal points are recorded on said transmission hologram.

6. The liquid crystal display device according to claim 2, wherein
   said transmission hologram has interference fringes formed thereon,
   said transmission hologram is divided into different areas, and
   the interference fringes have different spatial frequencies in the different areas.

7. The liquid crystal display device according to claim 2, wherein said reflector has a scattering reflective surface facing the rear side of said transmission hologram.

8. The liquid crystal display device according to claim 2, further comprising a polarizing film arranged at the front surface of said liquid crystal display panel.

9. The liquid crystal display device according to claim 2, further comprising a polarizing film arranged at the front surface of said transmission hologram.

10. A liquid crystal display device comprising:
    a liquid crystal display panel having front and rear sides;
    a volume type transmission hologram having front and rear sides, with the front side arranged to face the rear side of the liquid crystal display panel; and
    a reflector arranged at the rear side of the volume type transmission hologram, wherein the volume type transmission hologram transmits light received from the reflector without diffraction and diffracts and focuses light received from the liquid crystal display panel in order to direct and focus the transmitted light to a predetermined direction.

11. The liquid crystal display device according to claim 10, wherein the transmission hologram directs and focuses the transmitted light to a predetermined oblique direction other than a direction orthogonal to the liquid crystal display device.

12. The liquid crystal display device according to claim 11, wherein said transmission hologram comprises a plurality of holographic elements on which interference fringes with different spatial frequencies are recorded.

13. The liquid crystal display device according to claim 11, wherein interference fringes with different spatial frequencies are recorded on said transmission hologram.

14. The liquid crystal display device according to claim 11, wherein interference fringes with different spatial frequencies and different focal points are recorded on said transmission hologram.

15. The liquid crystal display device according to claim 11, wherein
    said transmission hologram has interference fringes formed thereon,
    said transmission hologram is divided into different areas, and
    the interference fringes have different spatial frequencies in the different areas.

16. The liquid crystal display device according to claim 11, wherein said reflector has a scattering reflective surface facing the rear side of said transmission hologram.

17. The liquid crystal display device according to claim 11, further comprising a polarizing film arranged at the front surface of said liquid crystal display panel.

18. The liquid crystal display device according to claim 11, further comprising a polarizing film arranged at the front surface of said transmission hologram.

* * * * *

UNITED STATES PATENT AND TRADEMARK OFFICE
CERTIFICATE OF CORRECTION

PATENT NO. : 6,643,039 B1
DATED : November 4, 2003
INVENTOR(S) : Atsushi Sato et al.

It is certified that error appears in the above-identified patent and that said Letters Patent is hereby corrected as shown below:

Title page,
Item [54], Title, change "REFLECTIVER" to -- REFLECTIVE --
Item [56], References Cited, U.S. PATENT DOCUMENTS, please add
-- 4,824,193   4/1989   Maeda et al.   359/15 --.

Signed and Sealed this

Thirteenth Day of April, 2004

JON W. DUDAS
*Acting Director of the United States Patent and Trademark Office*